United States Patent
Feldman et al.

(10) Patent No.: US 12,491,685 B2
(45) Date of Patent: Dec. 9, 2025

(54) MOLD THICKNESS UNIFORMITY CALIBRATION METHOD AND APPARATUS

(71) Applicant: Tritone Technologies Ltd., Rosh HaAyin (IL)

(72) Inventors: Alon Feldman, Kibbutz Kfar-Menachem (IL); Orit Raz, Hod Hasharon (IL); Itamar Carmel, Tel Aviv (IL)

(73) Assignee: Tritone Technologies Ltd., Rosh HaAyin (IL)

( * ) Notice: Subject to any disclaimer, the term of this patent is extended or adjusted under 35 U.S.C. 154(b) by 356 days.

(21) Appl. No.: 18/026,353

(22) PCT Filed: Sep. 30, 2021

(86) PCT No.: PCT/IL2021/051180
§ 371 (c)(1),
(2) Date: Mar. 15, 2023

(87) PCT Pub. No.: WO2022/070192
PCT Pub. Date: Apr. 7, 2022

(65) Prior Publication Data
US 2023/0373165 A1  Nov. 23, 2023

Related U.S. Application Data

(60) Provisional application No. 63/086,065, filed on Oct. 1, 2020.

(51) Int. Cl.
*B29C 64/393* (2017.01)
*B29C 33/38* (2006.01)
(Continued)

(52) U.S. Cl.
CPC ........ *B29C 64/393* (2017.08); *B29C 33/3842* (2013.01); *B29C 64/112* (2017.08);
(Continued)

(58) Field of Classification Search
CPC ... B29C 64/112; B29C 64/393; B29C 64/188; B29C 64/209; B29C 33/3842; B33Y 10/00; B33Y 50/02
See application file for complete search history.

(56) References Cited

U.S. PATENT DOCUMENTS

2017/0084882 A1  3/2017 Vronsky
2018/0162144 A1*  6/2018 Miller .................. A43B 3/0078
(Continued)

FOREIGN PATENT DOCUMENTS

EP       3259138        8/2019
WO    WO 2017/210254    12/2017
(Continued)

OTHER PUBLICATIONS

International Preliminary Report on Patentability Dated Mar. 20, 2023 From the International Preliminary Examining Authority Re. Application No. PCT/IL2021/051180. (13 Pages).
(Continued)

*Primary Examiner* — Jerzi H Moreno Hernandez

(57) ABSTRACT

A method of printing layers using a plurality of printheads, to achieve a printed surface of even thickness by compensating for printing density differences between the printheads, comprising obtaining for each of said print heads a relative printing strength, calculating a compensation value for each print head; and carrying out printing of a layer, wherein each print head is operated according to said compensation value.

12 Claims, 5 Drawing Sheets

(51) Int. Cl.
　　　*B29C 64/112*　　　(2017.01)
　　　*B29C 64/188*　　　(2017.01)
　　　*B33Y 10/00*　　　(2015.01)
　　　*B33Y 50/02*　　　(2015.01)

(52) U.S. Cl.
　　　CPC ............ *B29C 64/188* (2017.08); *B33Y 50/02* (2014.12); *B33Y 10/00* (2014.12)

(56) References Cited

U.S. PATENT DOCUMENTS

2018/0290399 A1　　10/2018　Lu et al.
2019/0009472 A1　　 1/2019　Mark
2020/0324488 A1*　10/2020　Rumbak ............... B29C 64/112

FOREIGN PATENT DOCUMENTS

WO　　WO 2019/130308　　7/2019
WO　　WO 2022/070192　　4/2022

OTHER PUBLICATIONS

International Search Report and the Written Opinion Dated Jan. 19, 2022 From the International Searching Authority Re. Application No. PCT/IL2021/051180. (23 Pages).

* cited by examiner

MOLD THICKNESS UNIFORMITY CALIBRATION METHOD AND APPARATUS

RELATED APPLICATION/S

This application is a National Phase of PCT Patent Application No. PCT/IL2021/051180 having International filing date of Sep. 30, 2021, which claims the benefit of priority under 35 USC § 119 (e) of U.S. Provisional Patent Application No. 63/086,065 filed on Oct. 1, 2020. The contents of the above applications are all incorporated by reference as if fully set forth herein in their entirety.

FIELD AND BACKGROUND OF THE INVENTION

The present invention, in some embodiments thereof, relates to a mold thickness uniformity calibration and, more particularly, but not exclusively, to apparatus and a method for obtaining uniform results using the calibration.

The present embodiments generally relate to the adjusting and control of the layer thickness produced by inkjet printheads in additive manufacturing, and particular reference is made to the additive manufacturing system that is disclosed in International Patent Application No. PCT/IL2018/050475, Molding Method and Apparatus, Particularly Applicable to Metal and/or Ceramics, Published Nov. 8, 2018, the contents of which are hereby incorporated herein by reference. Therein it is disclosed that wax molds are printed in three dimensions using print nozzles and then liquid material is poured into the mold to form the object or part. The material that is poured into the mold is typically a material that cannot be used directly in 3D printing, thus allowing additive manufacture using materials, which cannot normally be supplied using print nozzles, including metals and ceramics.

Precision parts with high tolerances may be made using the above process. To increase throughput in the 3D printing process, which is notoriously slow, multiple print heads are typically used. However a layer printed using multiple heads tends to be unable to print smooth layers. Height differences of several microns in size appear in the printed layer, which is enough to allow some of the liquid material to leak and generally to harm the integrity of the precision part being manufactured. The maximum tolerances that the process can offer are thus compromised.

Now, one way to produce an even layer thickness is to apply extra material and build a layer that is thicker than required. After that, the extra material is removed mechanically using a blade, roller, cuter, etc. The extra material that is removed from the "thick" layer is wasted, additional time is needed for a process, which is already notorious for being slow, and the complexity of the process is increased.

SUMMARY OF THE INVENTION

The present inventors noted that layers printed by multiple head printing devices tend to have step changes in height that coincide with boundaries between the regions printed by the different heads. Furthermore, the inventors noted that the heights of the boundaries vary over time. The differences were attributed to variations in capacity of the print heads due to manufacturing tolerances, and to in-use damage or degradation of the print heads over time including nozzles getting blocked and the like.

The present embodiments may thus achieve a printed layer of even thickness by compensating for printing density differences between the printheads. The method may involve obtaining for each of the print heads a relative printing strength, say obtained by measuring a thickness of a layer actually printed, and then carrying out compensation so that the print heads produce a smooth layer. For example, it is possible to reduce the densities printed by the stronger print heads, so that they do not print more than the weaker print heads. However, density reduction must be done without compromising the structural integrity of the mold.

In embodiments, a calibration process may be carried out initially and at regular intervals subsequently, to obtain the relative printing strengths and recalculate the compensation. In other embodiments, re-calibration may be carried out in real time during printing.

According to an aspect of some embodiments of the present invention there is provided a method of printing layers using a plurality of printheads, to achieve a printed surface of even thickness by compensating for printing density differences between the printheads, the method comprising:

obtaining for each of the print heads a relative printing strength;
calculating a compensation value for each print head; and
carrying out printing of a layer, wherein each print head is operated according to the compensation value.

In an embodiment, the relative printing strength is based on a layer thickness of a layer printed by the respective print head.

In an embodiment, the relative printing strength is relative to a reference print head.

In an embodiment, the reference print head is the weakest print head.

An embodiment may obtain obtaining the relative print strengths for respective ones or parts of the print heads from a pre-printing calibration printing operation, or obtaining the relative print strengths for ones or parts of the print heads from measurements of layer thickness taken during the printing process.

An embodiment may involve using thickness measurements taken from regions printed by each of the print heads respectively.

An embodiment may involve weighing regions printed by each printhead respectively to obtain the relative printing strengths.

An embodiment may involve obtaining the relative print strengths for respective ones of the print heads by measuring layer thicknesses printed by each print head during printing.

An embodiment may involve using image analysis to detect differences in layer thickness between regions printed by each printhead.

An embodiment may involve using a laser beam to measure layer thicknesses for regions printed by each printhead.

An embodiment may involve building a printing mask for each print head, wherein the printing mask indicates pixels to be deleted, the pixels to be deleted being in accordance with the respective compensation value.

In an embodiment, each of the pixels to be deleted is individually selected using a stochastic process, thereby to ensure structural integrity of layers being printed.

Embodiments may involve using a pattern of pixel deletions.

Embodiments may involve modulating a printing line density for each print head respectively, the printing line density selected according to the respective compensation value.

The printed layers may form part of a mold.

According to a second aspect of embodiments of the present invention there is provided a method of pre-printing compensation for printing layers using a plurality of printheads, to achieve a printed surface of even thickness, the compensation being for printing density differences between the printheads, the method comprising:

printing regions using each of the print heads;
measuring each of the regions;
obtaining for each of the print heads a relative printing strength;
calculating a compensation value for each print head; and
applying respective compensation values for regulating printing by each of the print heads, thereby to allow printing of a layer, wherein the print heads are compensated.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWING(S)

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

DESCRIPTION OF SPECIFIC EMBODIMENTS OF THE INVENTION

Figure 1:
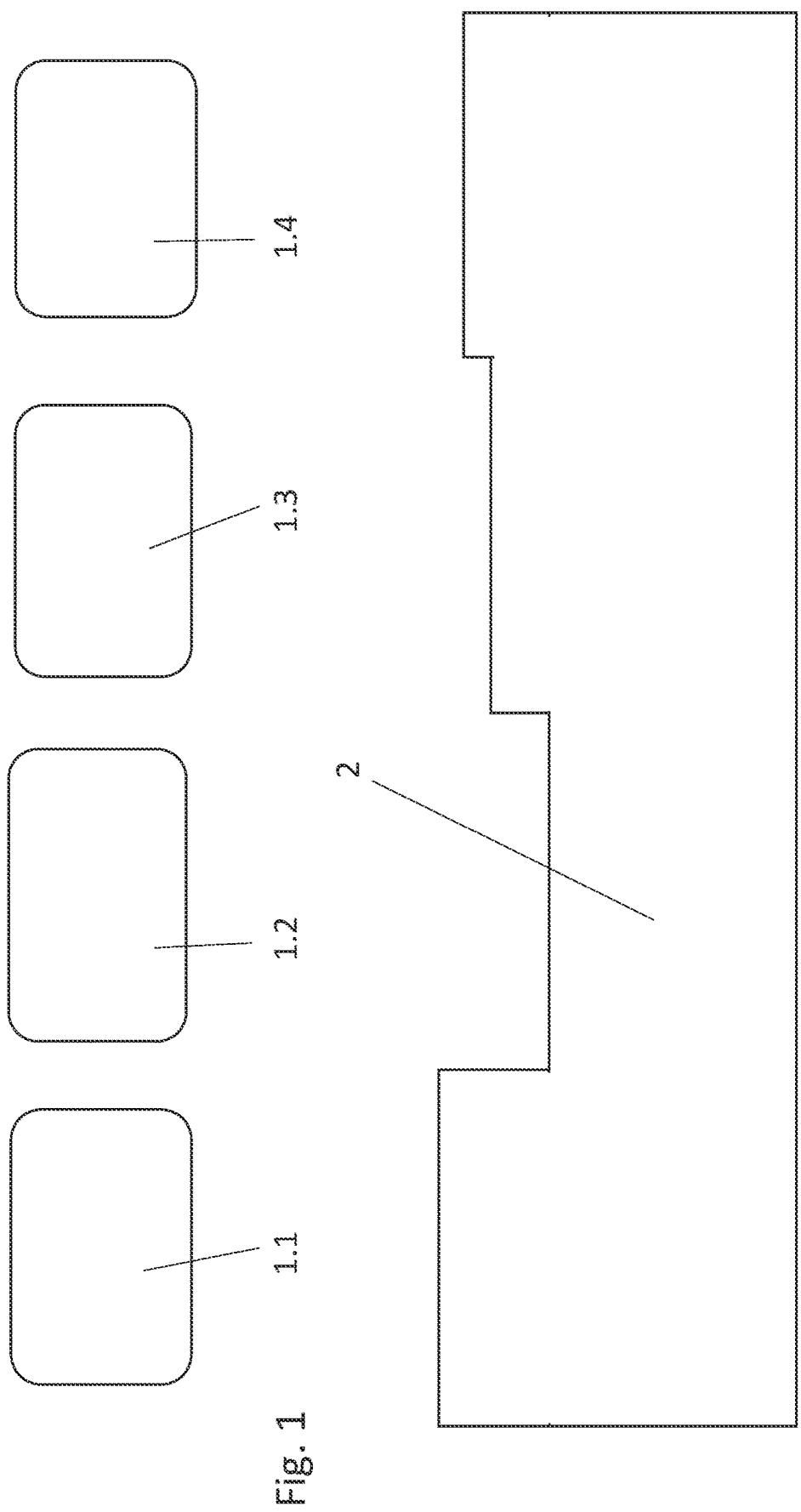
FIG. 1 illustrates a layer printed by a multiple head printing device and showing how the inventors noted that the height differences related to the individual print heads.

The present invention, in some embodiments thereof, relates to a mold thickness uniformity calibration and, more particularly, but not exclusively, to apparatus and a method for producing uniform results using the calibration.

In a process according to the present embodiments, inkjet heads jet mold material such as wax in a 3D printing process to form a mold.

Now, using the molding method as discussed can be very sensitive to the quality of the mold, especially if used to produce precision parts, and it is thus often necessary to produce an extremely uniform layer thickness, to a tolerance level in the micron magnitude. If the mold is not made to sufficiently high tolerance, then the metal or other material used to fill the mold may leak out through parts of the mold printed by a weaker printhead.

Printers however, often have a number of printheads that print in parallel to produce a layer, for example to increase throughput. Unfortunately, as determined by the present inventors, there tend to be step changes in height between regions printed by different heads. The differences in height furthermore are not constant over time.

The differences in height are attributed to variations between the print heads in terms of drop size, number of failed nozzles and so on. Consequently, when using multiple heads it is almost impossible to reach a uniform layer thickness. Even if some kind of adjustment is made, the adjustment is only valid for a limited time.

The present embodiments thus measure printed layers printed by the multiple print heads to detect the differences in density printed by each head. Density may be measured by the resulting layer thickness. A print density correction is applied to separate print heads respectively in a manner that does not harm the structural integrity of the layer printed and further layers are printed with the corrections applied so that all heads print at the same density. The print density correction as described herein relates to the switching off of a certain percentage of pixels so that the switched off pixels are not printed, hence reducing the volume of material provided to form the given volume, that is to say the density of the printed layer is reduced, as will be described in greater detail below.

The present embodiments are not limited to the presently considered process and may be extended to other digital printing devices that use multiple heads, including valve jets, applicators, continuous inkjet printers etc.

In the present embodiments, the printing resolution is set to produce a theoretical thicker layer than required from all printheads. But, instead of removing the excess material mechanically, the printheads are set in advance to a compensation mode, in which the heads are compensated for their capacity differences, each head being operated with its own compensation factor, so that each head prints the same volume to form layer parts of the same density. For example, a first head may be set to produce 97% of drops in comparison to a fully operated head and a second head may be set to produce 95% only while the weakest head may be operated at 100% capacity.

Some of the present embodiments may achieve such a state of affairs using a masking method, as will be described hereinbelow. Another embodiment varies the scanning density of different heads.

In one embodiment, calibration is used based on a test print, to find out what offsets from a target thickness each print head produces, and then the weakest head is set to full capacity or a reference capacity, and the remaining heads to a reduced percentage. In another embodiment, density measurements are made during actual printing processes.

In one embodiment, compensation may involve a masking method. In the masking method, a reduction in the number of drops jetted by an individual head may be achieved by manipulating the layer information, typically in the form of bitmap data, sent to the jetting nozzles. If such a masking technique is used then the compensation percentage or proportion required of the given printhead is translated into a number of drops of print material that need to be removed over a given area in order to reduce the material volume. A mask bitmap is thus created with the pixels marked that need to be removed from the layer. The positive pixels may in one embodiment be arranged in a pattern to ensure uniform spread of removed pixels over the printing area, since if deleted pixels were to be concentrated in any way, this would compromise the structural integrity of the resulting mold. In another embodiment, a stochastic process is used in which a random variable is set with the required probability and is used to set or reset individual pixels. The result is a masking bitmap, herein also referred to as masking data.

In the process of preparing Layer Data for printing, the basic layer data may be combined with the Masking Data, typically by using an AND operation. Thus, if a corresponding pixel in both layers is "1" then the pixel in the Layer Data will be "1". In any other case, it will "0". Thus only if both the mask and the data are set to "1" is the pixel printed, and thus pixels turned off in the mask are not printed.

The result is that positive areas in the Layer Data may have a pattern of holes of negative pixels that are not printed, so that the numbers of pixels and thus the resulting layer densities printed by the stronger printheads are reduced. Thus, the different printheads print the same volumes of material.

An alternative way of equalizing the printing densities is to manipulate the scanning resolution of each head individually. Thus, the weaker heads produce a more dense arrangement of pixels. Scanning resolution may be adjusted in the head advance direction rather than the scan line direction, that is to provide scan lines which are closer together or further apart. Changing the density along the scan is harder since the resolution within the line is limited to multiples of the head native resolution and as a result, it is difficult to vary by exact percentages. Thus, for example, changing the scanning resolution from 1800 dpi to 1600 dpi means bringing about a change of a factor of 1600/1800 in the layer thickness, which is generally too large.

To understand the amounts involved in a typical situation, the addressable resolution of the inkjet head or in other words, the density of drops (number of drops per square inch for example) determines the mold layer thickness. The layer thickness increases as the resolution increases. For example, 1800×1800 dpi, of drops at a drop size of 20 pico-liter results in a layer thickness of about 100 microns.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

Reference is now made to FIG. 1, which shows what the present inventors discovered when looking for reasons in the unevenness of the layers when printing with multiple print heads. As shown, an arrangement of four print heads 1.1 ... 1.4 is used to print a layer 2. The layer 2 is uneven, with steps between regions at the boundaries between the print heads. Thus, it is inferred that the relative strength of each printing head is what leads to the region of the layer printed by the given print head being of a different thickness or a different weight or a different volume than other layers. Furthermore, it is noted that with the same print heads, the step changes do not remain constant but vary slowly over time.

An aim of the present embodiments is to provide a smooth layer, which is continuous over the boundaries of the areas printed by the different heads.

Figure 2:
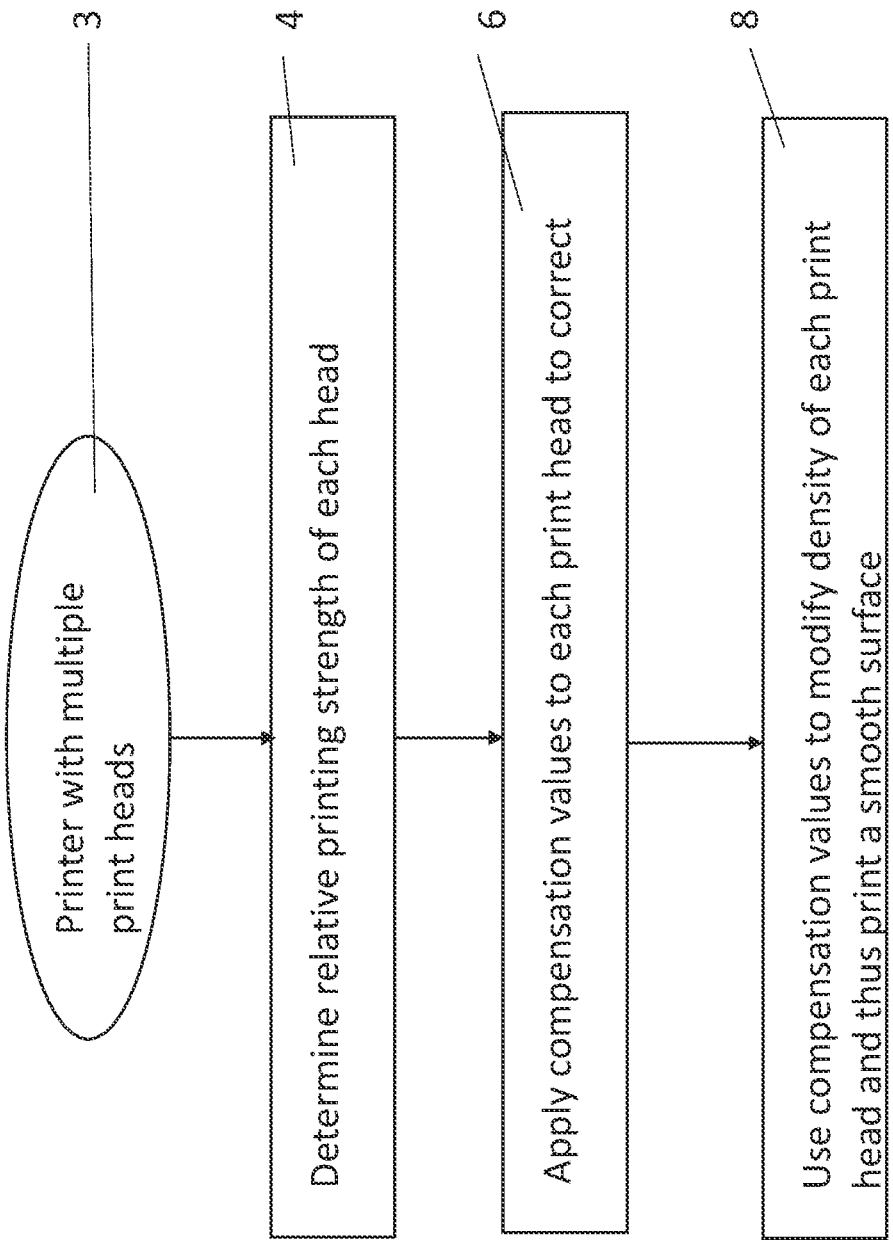
FIG. 2 is a simplified flow chart showing a generalized process for printing a smooth layer according to embodiments of the present invention.

Reference is now made to FIG. 2, which is a simplified flow diagram showing a process for modifying layer printing to provide a print layer that is smooth according to the present embodiments. Printing is carried out using a machine with multiple print heads—3. The method may comprise obtaining, for each of the print heads a relative printing strength, which is typically either a thickness or a weight of a layer or part of a layer printed by that head, the thickness being taken in proportion to the other values obtained from the other heads—4. Typically, one of the heads is taken as a reference and assigned 100% and the others are assigned proportions relative to the reference.

Then a compensation value is assigned to each print head—6, so that if the reference print head is printing at 100%, each other print head achieves the same actual thickness.

Typically, the weakest print head is taken as the reference layer and set at 100%. Then each other head has its capacity reduced accordingly. Thus if there are two heads and one is a weaker printer, only printing at 97% of the density of the other, then the weaker printer, that prints at 97%, is taken as the reference and set as 100%, that is it continues to print with no compensation. The stronger head is then given a compensation factor which sets it on 97%, so as to print the same thickness. Then a layer is printed in which each print head prints according to its modified capacity based on the compensation factor. Compensation values modify the density of each print head, with the weakest printer generally getting a null value of compensation, and other print heads getting a finite and positive compensation value so that all print heads print the same density of material.

Figure 3:
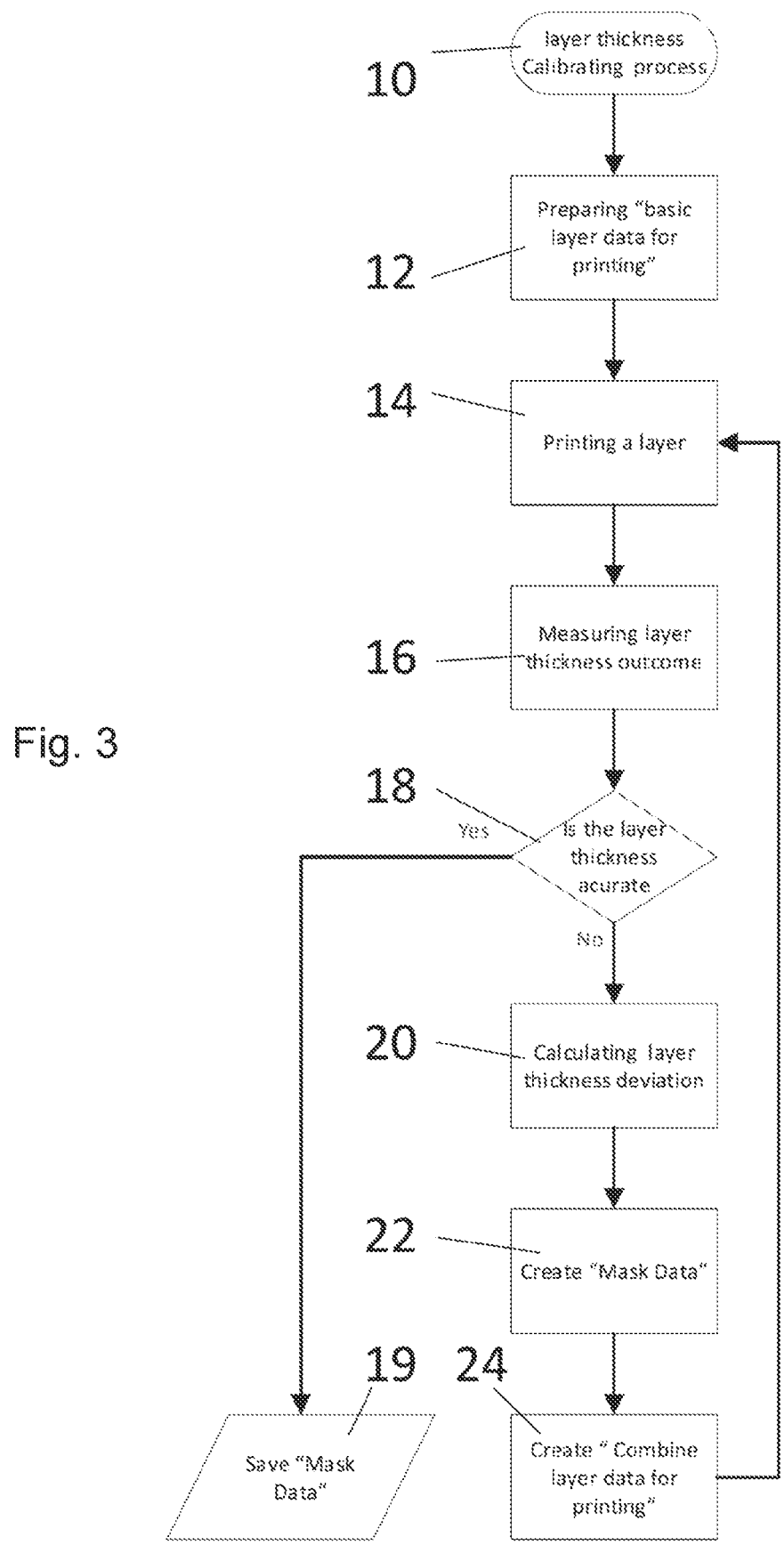
FIG. 3 is a simplified flow diagram showing a calibration process according to embodiments of the present invention.

Reference is now made to FIG. 3, which is a simplified flow chart illustrating printing preprocessing according to the present embodiments, in which a test print is carried out and a calibration process either assigns a mask to each printhead, or assigns a compensation factor which is then used to prepare a mask in the face of the actual printing data. The distribution of pixels may be corrected during printing based on measurement of the layer as pixels are printed, and such a process gives a large range of flexibility.

Layer thickness calibration 10 begins with preparing a basic printing bit map with layers for an object to be test printed 12. A layer is then printed—14—using each of the print heads on the printing machine. Four heads or multiples thereof are common in high capacity machines.

The resulting printed layer is then measured for thickness,—16—for example using lasers, or optical imaging, or mechanical or acoustic measuring systems to measure the thickness, the height of the layer, to micron accuracy. The results at this point may indicate that all heads are producing the same thickness and that printing is accurate, in which case the existing mask is accurate, and outcome "Yes" is followed, with nothing further to be done except save the data of the existing mask—19. However the measurement may show that certain of the heads are producing a thicker layer than others, and a step height between the regions printed by the different heads is formed, in which case outcome "No" is followed to box 18. The differences in thickness between the regions printed by the respective heads are assessed and differences typically lie in the range of single microns, say four microns.

In stage 20 the differences in thickness between the various regions are calculated as deviations from a reference thickness. The weakest of the heads, namely the head producing the thinnest layer, is taken as the reference thickness, so that if the strongest head deviates from the weakest head by 3% then the weakest head is assigned 100% and the strongest head is assigned 97%.

In stage 22 the percentages assigned in stage 20 are now used to create a mask. The mask is a bitmap, which is created by dividing the print area into separate sub-areas for each head. Then in the area of each head, an evenly distributed set of pixels is marked for deletion, the size of the set depending on the percentage assigned to the respective head. The pixels to be kept are set to "1" and the pixels to be deleted are set to "0". In the head that is selected as the reference head, the set of pixels to be deleted is a null set, and in the heads assigned a deviation percentage, a positive number of pixels is included in the set.

In an embodiment, weaker areas of the individual heads, say areas with concentrations of blocked pixels, may be given their own compensation factors.

In embodiments, a stochastic process may be used to select the pixels for deletion, to ensure that the distribution is random and does not affect the stability of the mold being printed. For example, a random variable may be applied separately to each pixel with an outcome probability set according to the compensation factor value assigned to the given print head. The switching off pixels based on a probability is similar to the way in which random pixels of a black sector of an image may be switched off to generate grey levels. Various other methods of generating a mask are available. For example in other embodiments a repeating pattern may be applied to each print head.

Such a calibration process may be repeated at intervals, for example once a week or once a month, or whenever the printing process starts to show problems, for example whenever measurements of the layer thicknesses start to show deviations.

The resulting mask is then available for use in printing operations where it is ANDed pixel by pixel with the bitmaps of the layer to be printed.

Figure 4:
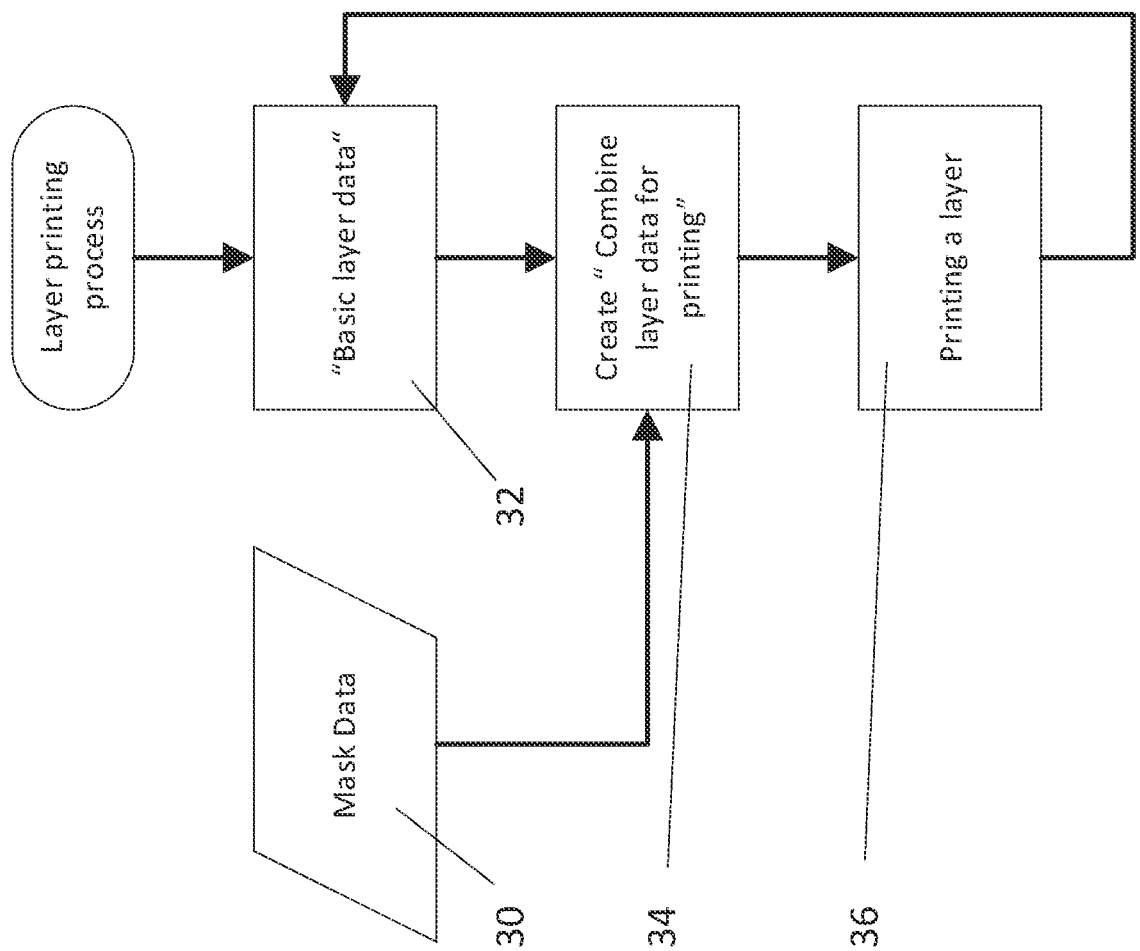
FIG. 4 is a simplified flow diagram showing a printing process according to embodiments of the present invention.

Reference is now made to FIG. 4, which is a simplified flow diagram showing how the printing process is carried out following the calibration process of FIG. 3.

The mask prepared in the calibration process above—30—and the printing data for printing the current data—32—are combined using an AND process to produce calibrated layer data for printing—34. The AND process randomly deletes pixels from the print map of the layer data to reduce the printing density as discussed.

Finally, in box 36, the layer is printed by operating the print heads. Each nozzle operates to jet material and print a pixel when it coincides with a "1" in the calibrated layer data, and otherwise does nothing. Thus, all the printheads produce a layer density, which is the same as the reference printhead, the stronger printheads printing with a reduced number of pixels, to reduce the density, where the reduced pixels are either stochastically selected or are chosen according a pattern.

Thus, the present embodiments may build a masking layer that provides for stochastic screening of the pixels to reduce pixel density.

An alternative calibration process may be carried out by printing separately with each printhead and then weighing each layer. The mask is then produced in the same way as in the previous embodiments according to percentages obtained from comparing the weights.

In a further embodiment, there is no separate calibration process. Rather the calibration and printing processes are carried out together. During the printing a laser or other suitable thickness indicator measures the output thickness and outputs any deviations. The deviations may in one embodiment be incorporated in real time to the current mask. In other embodiments a new mask is prepared for the next printing operation. In a variation, a photograph is taken of the layer produced and image processing is used to detect any changes in thickness.

Figure 5:
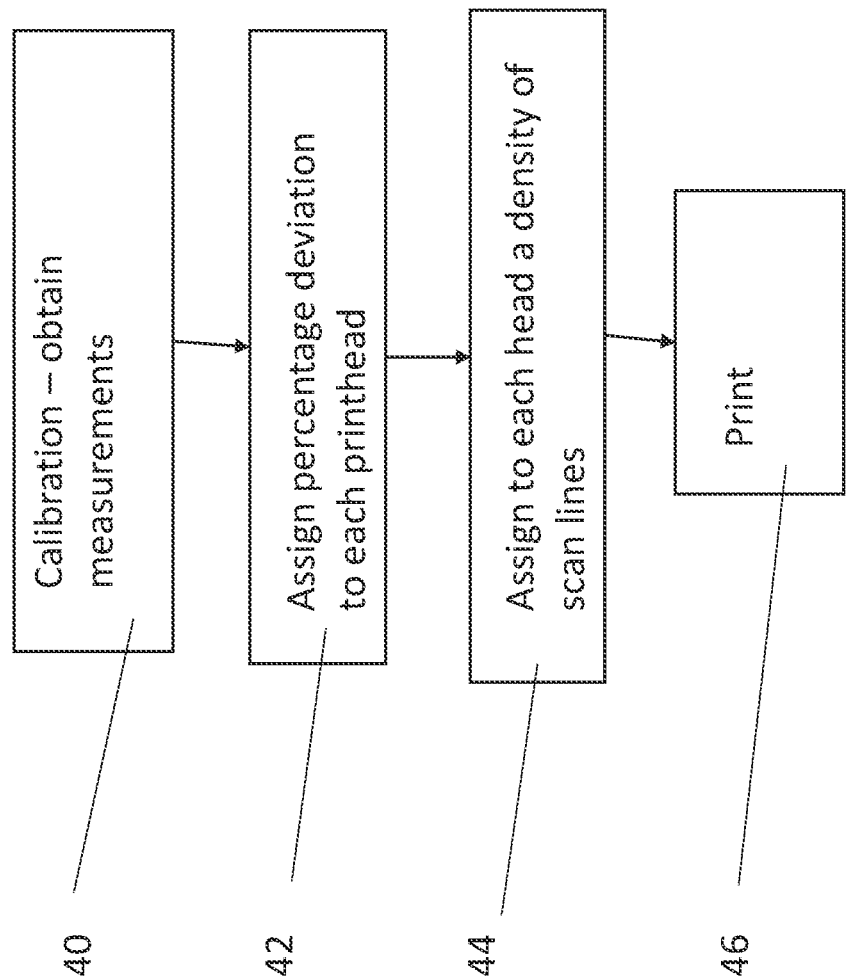
FIG. 5 is a simplified flow diagram showing a calibration and printing process according to a second embodiment of the present invention.

Reference is now made to FIG. 5, which illustrates a further embodiment of the present invention. In the embodiment of FIG. 5, a mask is not used. The calibration process—40—obtains thickness measurements or deviations for each print head area in any of the different ways described hereinabove, and a percentage or proportional deviation is assigned to the weaker print heads—42, again exactly as before. Then, instead of using a mask, each printer is assigned a density of scan lines based on the deviation, and scans—46—according to the assigned density to print the layer. Thus each head scans lines independently of the other heads. The same results may be achieved with a mask, or by changing the printing resolution in the scan direction.

It is expected that during the life of a patent maturing from this application many relevant 3D printing and additive manufacture technologies, measuring technologies and printing materials will be developed and the scopes of the terms concerned are intended to include all such new technologies a priori.

The terms "comprises", "comprising", "includes", "including", "having" and their conjugates mean "including but not limited to".

The term "consisting of" means "including and limited to".

As used herein, the singular form "a", "an" and "the" include plural references unless the context clearly dictates otherwise.

It is appreciated that certain features of the invention, which are, for clarity, described in the context of separate embodiments, may also be provided in combination in a single embodiment and the present description is to be construed as if such embodiments are explicitly set forth herein. Conversely, various features of the invention, which are, for brevity, described in the context of a single embodiment, may also be provided separately or in any suitable subcombination or may be suitable as a modification for any other described embodiment of the invention and the present description is to be construed as if such separate embodiments, subcombinations and modified embodiments are explicitly set forth herein. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

It is the intent of the applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A method of printing layers to form an object, using a plurality of printheads, to maintain a smooth surface over the course of printing by compensating for printing density differences between the printheads, the print heads each having a plurality of nozzles, the method comprising:
   obtaining for each of said print heads a print head relative printing strength, the print head relative printing strength being relative to a weakest print head printing strength of all of said print heads, the print head relative printing strength being obtained by measuring thicknesses across a calibration layer that is printed, and being based on step changes at print head boundaries across said calibration layer;
   calculating a print head compensation value for each print head, the print head compensation value being set to modify printing at each print head to print at a printing level of said weakest one of said plurality of print heads, said modified printing comprising switching off a number of nozzles in said print head, said number being defined by said respective compensation value, said nozzles to be switched off being selected using a stochastic process; and
   carrying out printing of said layers to form an object, wherein each print head is operated according to said respective print head compensation value, thereby to provide smooth printing of further layers.

2. The method of claim 1, wherein said calibration layer is from a pre-printing calibration printing operation, or wherein said calibration layer is one of said layers printed to form said object.

3. The method of claim 1, wherein each one of said plurality of print heads is directed to print said layers in a respective region of said object, the method comprising using thickness measurements taken from said respective regions printed by each of said print heads.

4. The method of claim 1, wherein each one of said plurality of print heads is directed to print said layers in a respective region of said object, the method comprising weighing said respective regions printed by each printhead to obtain said step changes and thus said relative printing strengths.

5. The method of claim 1, comprising obtaining said relative print strengths for respective ones of said print heads by measuring layer thicknesses of respective layers printed by each print head during printing.

6. The method of claim 4, comprising using image analysis to detect differences in layer thickness of respective layers between regions printed by each printhead.

7. The method of claim 1, wherein each one of said plurality of print heads is directed to print said layers in a respective region of said object, the method comprising using a laser beam to measure layer thicknesses for said respective regions printed by each printhead.

8. The method of claim 1, comprising building a printing mask for each print head, wherein said printing mask indicates pixels to be deleted, said pixels to be deleted being in accordance with said respective compensation value.

9. The method of claim 8, wherein each of said pixels to be deleted is individually selected using said stochastic process, thereby to ensure structural integrity of layers being printed.

10. The method of claim 1, comprising modulating a printing line density for each print head respectively, said printing line density selected according to said respective compensation value.

11. The method of claim 1, wherein said object is part of a mold.

12. A method of pre-printing compensation for printing a plurality of layers to form an object using a plurality of printheads, each print head having a plurality of nozzles, said compensation being to achieve a smooth printed surface over the course of printing, by correcting for printing density differences between the printheads, the method comprising:
   printing regions using each of said print heads;
   measuring layer thicknesses of each of said regions printed, to find step changes at print head boundaries;
   obtaining for each of said print heads a relative printing strength based on said step changes;
   calculating a print head compensation value for each print head; and
   applying respective print head compensation values for regulating printing by each of said print heads by switching off a number of nozzles in each respective print head, said number being defined by the corresponding compensation value, nozzles to be switched off being selected using a stochastic process, thereby to allow printing of respective layers of said plurality of layers by respectively remaining nozzles, such that said printing density differences between said print heads are compensated for to eliminate said step changes.

* * * * *